June 30, 1931.  G. H. PAPPAS  1,812,710
TIRE PROTECTOR
Filed June 23, 1930
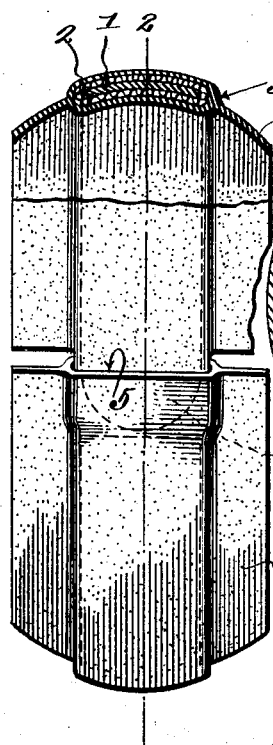
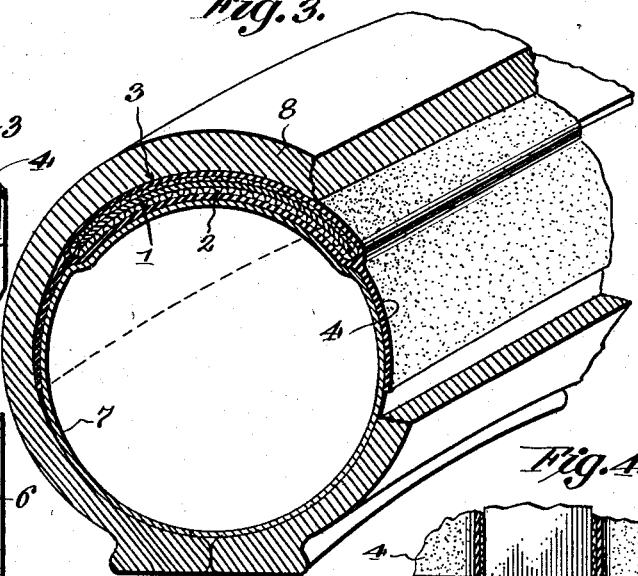
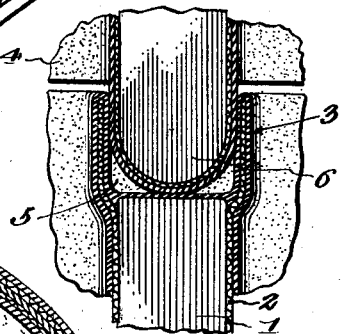
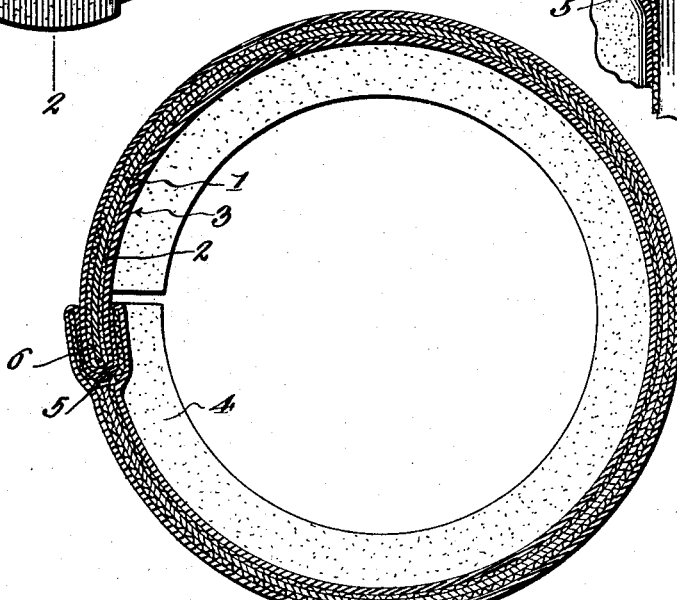
INVENTOR.
GEORGE. H. PAPPAS
BY
ATTORNEY Patented June 30, 1931

1,812,710

UNITED STATES PATENT OFFICE

GEORGE H. PAPPAS, OF BALTIMORE, MARYLAND

TIRE PROTECTOR

Application filed June 23, 1930. Serial No. 463,088.

This invention relates to pneumatic tire protectors and has for its object the production of a simple and efficient removable protector means which may be placed within the tire casing between the casing and the inner tube to prevent the puncture of the inner tube.

Another object of this invention is the production of a simple and efficient tire protector for use in connection with pneumatic tires which is so constructed as to facilitate the placing of the device within the tire casing and at the same time is so constructed as to facilitate the anchoring of the protector within the casing against movement therein.

A still further object of this invention is the production of a simple and efficient means for protecting the metal strip mounted within the protector so as to prevent this strip from cutting into the casing or into the inner tube.

Other objects and advantages of the present invention will appear throughout the following specification and claims.

In the drawings:—

Figure 1 is a front elevation of the protector, a portion thereof being broken away in transverse section.

Figure 2 is a vertical section taken centrally through the protector, taken on line 2—2 of Figure 1.

Figure 3 is a sectional perspective view of a portion of the tire showing the protector mounted therein.

Figure 4 is an enlarged sectional view showing the connecting joint for the free ends of the protector band.

By referring to the drawings it will be seen that the present invention comprises a substantially circular flat band 1, preferably formed of spring steel or other suitable material, which band 1 is preferably slightly curved transversely to conform to the contour of a tire casing. This metallic band 1 is provided with an opened end and is mounted within a fabric or canvas casing or covering 2, which canvas covering 2 passes entirely over the body of the metal band to protect the same against cutting into the tire casing or injuring the inner tube. This fabric or canvas casing or envelope, as it may be called, is then covered with a coating or rubber to constitute a rubber covering 3, which rubber covering 3 is provided with laterally extending webs 4, which webs 4 extend for an appreciable distance laterally of the side edges of the metallic band as clearly illustrated in Figure 1.

As shown clearly in Figures 1, 2, and 4, the fabric envelope is provided at one end with a socket or pocket 5, constructed by terminating one end of the metal band 1 short of the envelope. The opposite end of the metal band 1 is preferably rounded as indicated at 6 and is also covered with the suitable covering above described and is adapted to project and fit into the pocket 5 formed in the adjoining end of the protector envelope or casing. This structure is clearly illustrated in detail in Figures 1, 2, and 4.

As shown in Figure 3, the webs 4 are adapted to adhere snugly to the sides of the tire casing and fit between the inner tube and the casing, thereby permitting the inner tube 7 to constitute an efficient means for anchoring the entire protector in a set position in the tire casing 8. The device is so mounted as to have the protector steel band 2 extend under the normal tread of the tire as indicated clearly in Figure 3 of the drawings.

From the foregoing description it will be seen that a very simple and efficient protector has been produced which may be placed within the usual form of pneumatic tire casing in such a position as to efficiently protect the tread of the tire tube against puncture. It will also be seen that the webs 4 will constitute an efficient means by passing along the inner faces of the sides of the tire casing to efficiently hold the protector in place. The interfitting end structure by having one end of the band fit within the pocket formed in the envelope of the band will constitute an efficient means for joining the free ends of the protector together and at the same time permit a suitable expansion and contraction as may be necessary in the operation of the device and in placing a protector within the tire.

It should be understood that certain detail changes in the mechanical construction may be employed without departing from the spirit of the invention, so long as these changes fall within the scope of the appended claims.

Having described the invention:—
What I claim as new is:

1. A device of the class described comprising an open ended metallic band, an envelope surrounding said band, said envelope provided with a pocket at one end, the opposite end of said band adapted to fit within said pocket, and means for facilitating the anchoring of said protector within a tire casing.

2. A device of the class described comprising an open ended band, an envelope surrounding said band and provided with a pocket at one end for receiving the opposite end of the band, and flexible webs formed along the longitudinal edges of said envelope and adapted to snugly fit against the inner face of a tire casing for anchoring said protector against lateral displacement.

3. A protector for pneumatic tires comprising an open ended metallic band, a canvas envelope fitted around said band and provided with a pocket at one end adapted to receive the other end of said band, and a rubber covering molded around said envelope and provided with flexible side webs projecting laterally therefrom.

In testimony whereof I affix my signature.

GEORGE H. PAPPAS.